Figure 1:
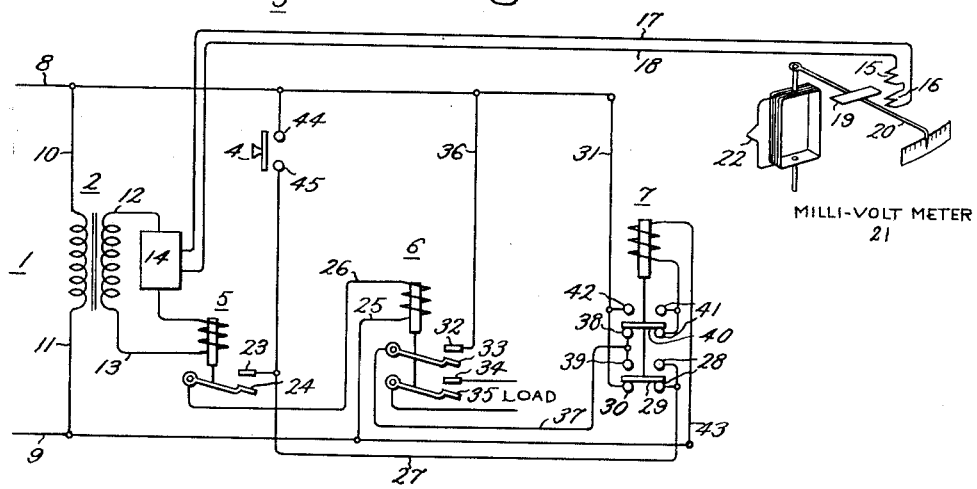

July 20, 1954   J. K. SIDEBOTTOM   2,684,456
AUTOMATIC RESTORATION FOR OVER-TEMPERATURE PROTECTIVE UNITS
Filed June 15, 1951

Inventor:
Joseph K. Sidebottom,
by Russell A. Warner
His Attorney.

Patented July 20, 1954

2,684,456

UNITED STATES PATENT OFFICE 2,684,456

AUTOMATIC RESTORATION FOR OVER-TEMPERATURE PROTECTIVE UNITS

Joseph K. Sidebottom, Lynn, Mass., assignor to General Electric Company, a corporation of New York Application June 15, 1951, Serial No. 231,702

4 Claims. (Cl. 317—133.5)

1

This invention relates to an over-temperature protective unit and, in particular, to an automatic restoration for such a unit when it fails due to the falling off of a control power supply.

An over-temperature protective unit is a device that prevents the overheating of a furnace or the like. For example, an over-temperature protective device, when used with an electrically controlled furnace, would cut off the power supply thereto when the temperature reached a predetermined level.

It is to be understood that the temperature of a furnace is usually maintained at a desired level by means of a controller; a control system which responds to changes in furnace temperature to turn the furnace heat off or on as appropriate to correct the temperature changes. This control function is performed by an instrument entirely separate from the over-temperature protective unit, the latter of which acts as a safety valve in case malfunctioning of the controller permits the temperature of the furnace to rise above a desired level. Consequently, the over-temperature protective unit is set to operate at a temperature somewhat above the temperature at which the furnace is usually maintained by the controller.

While, for the purpose of this description, reference is made to a particular type of furnace, it is to be realized that such a furnace has been selected merely as an example to point out more clearly the features of this invention and it is not in any way to be considered a limitation on the scope of this invention.

Electric furnaces conventionally have a main power supply and a control power supply, the latter of which supplies power through the control circuit to control the opening and closing of contacts in the main power line. For example, a thermostat responsive to the temperature of a furnace would open and close a switch in the control voltage line which, in turn, might operate a relay to regulate the main power supply.

With this type of heating circuit, it is common, after a predetermined furnace temperature has been reached, to have a thermostat function to shut off the power to the furnace in such a manner that the power cannot again be turned on except by manual reset. A manual reset or lockout is required because if the controller fails and permits the temperature to reach the point at which the over-temperature protective unit is set, the protector will turn off the heat, the furnace will cool, and if it were

2 not for the lockout feature, the protector would reclose the heating circuit after a certain degree of cooling. In other words, the protector would function as a controller and maintain the furnace temperature at the point at which the protector is set. Obviously, this is not a desirable feature and a lockout device is used to prevent its occurrence. Unfortunately, however, in the conventional arrangement, the manual reset must be used to restore power after any interruption in the control power supply, i. e., whether the interruption be due to an open thermostat, under voltage conditions, or power failure.

For this reason, a temporary power failure at night would cause the conventional over-temperature protective unit to shut down the furnace and keep it shut down all night. Such a shut down causes loss of time and possibly loss of material.

To prevent this loss of time and material, it is an object of this invention to provide a new over-temperature protective unit which will shut off power to the furnace when the predetermined temperature has been reached, necessitating restart by manual reset and which will automatically restart if the furnace interruption is due to control voltage failure.

It is a further object of this invention to provide an improved automatic circuit restoration device responsive to control voltage failure.

Further objects and advantages of this invention will become apparent and the invention will be more clearly understood from the following description referring to the accompanying drawings, and the features of novelty which characterize this invention will be pointed out with particularity in the claims annexed to and forming a part of this specification.

Briefly, this invention comprises a new over-temperature protective circuit for regulating an electrically controlled furnace. If the furnace reaches a predetermined temperature, the protector will interrupt the furnace control and the circuit will not be restored unless manually reset, but if the control system is interrupted due to voltage failure, then it will be automatically restored.

A control furnace of the type with which this new and improved over-temperature device would operate is shown and described in complete detail in a copending application of Philip C. Michel, Serial No. 719,437, filed December 31, 1946, now Patent No. 2,584,728, issued February 5, 1952, and assigned to the same assignee as that of the present application.

Figure 2:
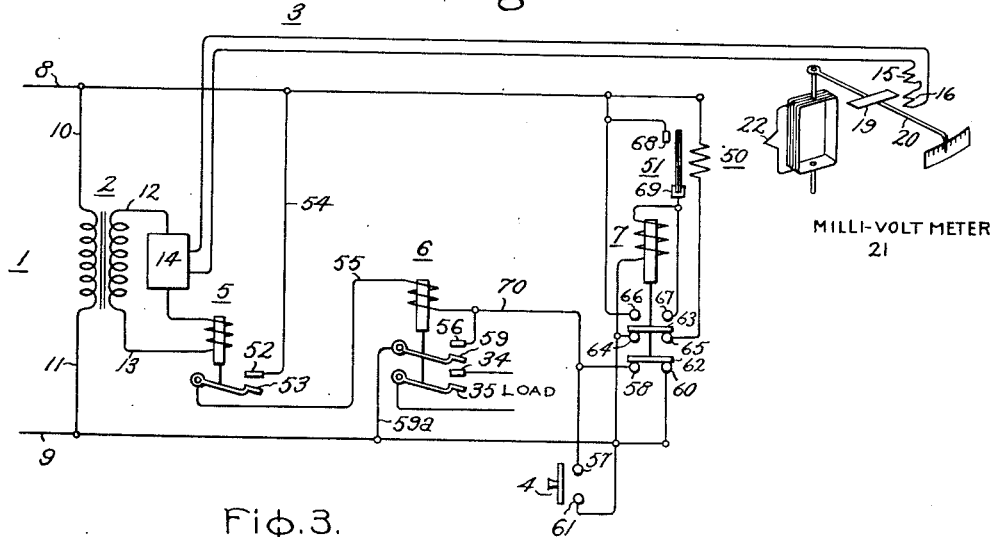
Figure 3:
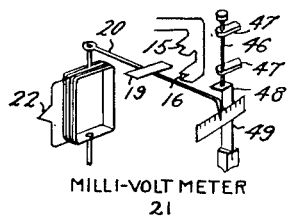

Referring to the drawing, Fig. 1 is a schematic diagram of the new and improved control system, Fig. 2 is a schematic diagram of a modification of the embodiment shown in Fig. 1, and Fig. 3 is a detail view showing another modification which may be used with either the Fig. 1 embodiment or the Fig. 2 embodiment.

Referring to the drawing, a control circuit is shown comprising a control power supply 1, a transformer 2, an oscillating circuit 3, a pushbutton 4, and a plurality of relays 5, 6, and 7.

The control supply 1 includes a pair of bus leads 8 and 9, which carry the control voltage. The primary of transformer 2, for example, is connected by leads 10 and 11 to the bus leads 8 and 9. The secondary of transformer 2 through leads 12, 13 is connected to the oscillating circuit 3.

Oscillating circuit 3 is more completely described in the above-mentioned Patent 2,584,728. However, the oscillating circuit 3 basically comprises an oscillator 14 and a pair of coils 15, 16 connected to the oscillator through the leads 17, 18. The reactance of coils 15, 16 is responsive to the positions of a vane 19 secured to an indicator 20 of a millivoltmeter 21, which, in turn, is activated by a thermocouple 22.

Briefly, the operation of the oscillating circuit is as follows. When the vane 19 is not between the coils 15 and 16 (for example, when the temperature of the furnace is not up to the predetermined level), then sufficient current will flow through the oscillator 14 to pick up the relay 5. However, when the vane 19 is positioned between the coils 15 and 16 (for example, when the temperature of the furnace is above the predetermined level), the current flowing through the oscillator 14 decreases and relay 5 drops out.

In the embodiment of the improved control circuit shown in Fig. 1, the relays are in the dropped-out position which they assume when no power is supplied to the control circuit 1. When power is supplied to the control circuit 1 and when the vane 19 indicates a temperature below that which has been predetermined, then sufficient current flows through the oscillator 14 for relay 5 to pick up to close the contacts or terminals 23, 24.

Closed contacts 23, 24 complete a circuit from bus 9 through lead 25 to load or power relay 6, through the coil of the load or power relay, through lead 26, through the contacts 24, 23, through lead 27 to the terminal 28 of voltage responsive relay 7, across contactor 29 and through terminal 30 of relay 7, and then through lead 31 to bus 8. This complete circuit causes load relay 6 to pick up and close the auxiliary contacts 32, 33, and 34, 35, the latter of which are the contacts of the load switch in the load circuit.

The closed contacts 32, 33 complete the circuit from bus 8 through lead 36, through contacts 32, 33, through lead 37 to terminals 38 and 39 of relay 7, through contactor 40 and terminal 41 of relay 7, then through the coil of the relay, and back to bus 9.

When relay 7 picks up as has been described, the contactors 29 and 40 are also picked up to close across the terminals 28, 39 and 41, 42, respectively. To prevent chattering, a relay having make before break contacts is employed. Such relays are well known (for example, in telephone circuits) and in this particular instance relay 7 would be constructed so that contacts 41, 42 must close before contacts 38, 41 open and relay 7 would be constructed so that contacts 39, 28 must close before contacts 30, 28 open. If contact 41 were not connected to contact 42 before it was disconnected from contact 38, relay 7 would drop out during the transfer. If contact 28 were not connected to contact 39 before it was disconnected from contact 30, relay 6 would drop out during the transfer.

When this happens, then relay 6 is held in by a circuit from bus 9, through lead 25 to the coil of the relay 6, through lead 26, contacts 24, 23, lead 27, terminal 28, contactor 29, terminal 39, lead 37, contacts 33, 32, and lead 36 to bus 8.

Relay 7 is held in by a circuit from bus 8, through lead 31, through terminal 42, contact 40, terminal 41, coil of relay 7, and through lead 43 to bus 9.

This condition with relays 5, 6, and 7 picked up will exist until either of two things happen, i. e. until vane 19 passes between the coils 15, 16 in response to the furnace temperature, or until an under voltage condition exists in control circuit 1.

If the first of these conditions exist, i. e. if the vane 21 passes between the coils 15, 16, then relay 5 drops out to open the contacts 23, 24, thereby breaking the circuit through relay 6, which in turn causes the load contacts 34, 35 to open.

It is to be noted, however, that the relay 7 will not drop out when the vane 19 passes between the coils 15, 16 since relay 7 is energized directly from bus 8, through lead 31, terminal 42, contactor 40, terminal 41, coil of relay 7, lead 43, to bus 9. This is an important point, since while relay 7 is picked up, relay 6 cannot automatically pick up, even though the vane 21 recedes from between the coils 15, 16 as the furnace cools off. That is, even though the furnace cools off the vane 19 recedes to allow relay 5 to pick up and close the contacts 23, 24, still there is no circuit through relay 6 as can be seen by tracing a circuit from bus 9 through lead 25 and the coil of relay 6, lead 26, contacts 24, 23, lead 27 to terminal 28, through contactor 29 to terminal 39 and through lead 37 to contact 33. Here, however, it can be seen that there is no circuit across contact 33, 32 to conduct current through lead 36 to bus 8. Consequently, relay 6 cannot again pick up unless the reset button 4 is closed to allow current to pass from bus 8 through terminals 44, 45 of reset button 4, through contacts 23, 24, lead 26 to coil of relay 6 and lead 25 to bus 9.

This circuit makes obvious that once the temperature of the furnace has reached its predetermined level, then it cannot be started on another cycle to bring it up to its predetermined temperature again, unless the temperature falls far enough to cause relay 5 to pick up and the reset button 4 is used to close across its terminals 44, 45.

However, if an under voltage exists across the control circuit 1, then all three relays 5, 6, and 7 will drop out and the existing condition will be that which was described in the beginning of this description. After an under voltage, providing vane 21 is not between the coils 15, 16, then when relay 5 picks up, relay 6 will be picked up to energize the furnace and it will remain energized until the vane 21 passes between the coils 15, 16.

Oviously, this new and improved control circuit insures the fact that power will be supplied to the furnace no matter how many times the control circuit is broken unless the predetermined temperature of the furnace is reached. Once it is reached, then power cannot be reapplied to the furnace unless pushbutton 4 is used to energize the terminals 44, 45.

While the foregoing description illustrates a circuit that prevents the reconnection of load contacts 34, 35 after relay 5 has dropped out, unless pushbutton 4 is used to energize terminals 44, 45, yet if the vane 21 did pass between coils 15, 16 to cause relay 5 to drop out, and then the control voltage dropped off, the situation would exist wherein it would be possible for the circuit to be energized again, since relay 7 would drop out due to the undervoltage, and then as was described in the opening part of this description power could be reapplied to the furnace. To avoid the possibility of this contingency, which, by the way, would be minute, it is possible to use a device such as that shown in the inset in Fig. 3 which comprises a needle 46 positioned in a guide 47 which is located above the level of the vane 19. A lightly springed plate or shelf 48 supported on spring 49 prevents needle 46 from dropping. When vane 19 hits the spring 49, however, the plate 48 is moved to the right, allowing needle 46 to drop and thereby preventing the return of indicator 20 to its normal position in spite of the cooling off of the electric furnace. With this arrangement, even though the vane passed between the coils 15 and 16 to open relay 5, and then the control voltage dropped off to let relay 7 drop out, still power could not be reapplied to the furnace until the needle 46 was raised to allow vane 19 to return to its normal position. It is obvious then that a signal would exist disclosing to the operator that the furnace had once been heated to its predetermined temperature.

While a spring-operated shelf has been described for positioning of the needle 46, it is obvious that in very delicate instruments, an electric eye could be used in conjunction with a solenoid in place of this spring 49 to cause needle 46 to drop and prevent the return of vane 21, until the needle was taken out of its way.

A second embodiment of this invention is shown in Fig. 2. The circuit is designed to open the load circuit on tube failure, power failure, or over-temperature. The circuit provides automatic reclosing upon restoration of power after a failure, and manual reclosing after over-temperature shutdown.

Comparing Fig. 1 and Fig. 2 like parts are indicated by like numbers and the parts in Fig. 2 have substantially the same function as corresponding parts in Fig. 1. The control circuit 1 in Fig. 2 comprises a power supply including the bus 8 and bus 9, transformer 2, oscillator 14, oscillator circuit 3, a plurality of relays 5, 6, and 7, a heater 50, a bimetal 51, and pushbutton 4.

Transformer 2 is connected by leads 10, 11 respectively to buses 8 and 9. The oscillating circuit 3 has the same composition as that described relative to Fig. 1.

The energization of the relays in the embodiment of Fig. 2, however, is slightly different from that shown in Fig. 1. For example, relay 5 has a pair of terminals 52 and 53, with terminal 52 connected to bus 8 by means of lead 54, and contact 53 being connected to relay 6 by means of lead 55. The other end of the coil of relay 6 is connected to terminals or contacts 56, 57, and 58. Contact 56 engages terminal or contact 59 when relay 6 is energized; contact 58 is electrically connected to terminal or contact 60 when relay 7 is not energized; and contact 57 is electrically connected to contact 61 when pushbutton 4 is closed.

As pointed out in the description re Fig. 1, relay 6 when energized, closed the power contacts 34 and 35 to supply power to the furnace.

Relay 7 has a pair of contactors 62 and 63. When relay 7 is deenergized, contactor 62 establishes electrical connection between terminals 58 and 60 and contactor 63 provides electrical contact between terminals 64 and 65. When the relay 7 is energized, however, contactor 63 connects terminals 66, 67, while contactor 62 opens the circuit between terminals 58, 60.

A further item in the embodiment of Fig. 2, is the electric heater 50, which is electrically connected to the bus 8, and to terminal 65. Heater 50 is placed in physical proximity with a bimetal 51, which closes across terminals or contacts 68, 69 after it has been heated.

The control circuit as thus described functions as follows. When power is supplied to the circuit, the oscillating tube 14 is energized and the circuit 3 is energized, whereupon, if vane 19 is not between the coils 15, 16, then relay 5 picks up to close the contacts 52, 53.

With contacts 52, 53 closed, current passes from bus 8 through lead 54, contacts 52, 53, through lead 55 to relay 6, through the coil of relay 6, and lead 70 to terminal 58, through contactor 62 to terminal 60, and then to bus 9. Thus, when relay 5 picks up, relay 6 is energized and the load contacts 34, 35 are closed to supply power to the electric furnace. When relay 6 picks up, its contacts 56, 59 are closed to seal in relay 6 through lead 59a.

Simultaneous with the application of power to the control circuit 1, heater 50 is energized from bus 8 through terminal 65, contactor 63, terminal 64, to bus 9. Thus, heater 50 deflects the bimetal 51 until it closes contacts 68, 69, thereby energizing relay 7 as follows. Specifically, current passes from bus 8 through bimetal 51 to one end of relay 7, through its coil to bus 9. When relay 7 picks up, it closes contactor 63 across terminals 66, 67, thereby bypassing the bimetal 51 and opening the circuit between terminals 65 and 64 to deenergize the heater 50 and permit it to cool. Contactor 62 is also lifted out of engagement with terminals 58, 60.

Now, when the furnace comes up to temperature and the vane 19 passes between the coils 15, 16, the oscillator tube current passing through relay 5 decreases and causes relay 5 to drop out to open the contacts 52, 53, thereby dropping out relay 6 and opening the power contacts 34, 35. Relay 7, however, remains energized as long as sufficient voltage is applied to control circuit 1. When vane 19 recedes in response to the cooling of the furnace, relay 5 is again picked up. Note, however, that relay 6 cannot pick up because its contacts 56, 59 are open; the contacts 58, 60 are open; and the contacts 57, 61 are open. It is obvious, therefore, that power is reapplied to the load by pressing the reset or pushbutton 4 to close the contacts 57, 61 and thereby energize relay 6.

On the other hand, if the relays 5, 6, and 7 drop out due to an undervoltage, or other power failure, then when the control circuit is again energized, power will be applied to relay 5, which will pick up and energize relay 6 as has heretofore been described, thereby reapplying power to the furnace.

Obviously, an arrangement such as that shown in Fig. 3 could be employed to prevent the automatic return of vane 19 after the furnace was cooled.

Modifications of this invention will occur to those skilled in the art, and it is desired to be understood, therefore, that this invention is not intended to be limited to the particular embodiments disclosed. For example, the possible applications of this new automatic restoration device are broad enough to include furnaces heated with coal, gas, oil, etc. The automatic restorer is also suitable for use with temperature measuring instruments of the resistance type rather than just the thermocouple type. The restorer could be made to respond to changes in almost any physical quantity provided the change could act as a signal to cause a small aluminum vane to be moved between two coils. Consequently, this invention is intended to cover all modifications which are within the true spirit and scope of this invention.

What I claim as new and desire to secure by Letters Patent of the United States is:

1. A protective device responsive to excessive values of a controlled condition, comprising a first relay, a first set of relay contacts operated by said first relay, means selectively energizing said first relay to maintain said first set of contacts normally closed and to open said first set of contacts upon the occurrence of such excessive values, a load switch, a second relay operating said load switch, a second set of relay contacts, voltage supply connections normally providing a relay-energizing supply voltage, said second relay and said first and second sets of contacts being connected in series to said supply connections whereby said second relay is energized whenever normal supply voltage is provided and both of said first and second sets of contacts are closed, a third set of relay contacts closed only when said second relay is energized, said third set of contacts being connected in parallel with said second set of contacts, whereby said second relay remains energized upon an opening of said second set of contacts alone, and relay means responsive to the supply voltage and closing said second set of contacts upon any interruption of the normal supply voltage and opening said second set of contacts after normal supply voltage is provided.

2. A load-circuit protective device responsive to over-temperature conditions, comprising temperature-responsive oscillator means, a first relay normally energized by said oscillator means and deenergized upon the occurrence of over-temperature conditions, a first set of relay contacts closed only when said first relay is energized, a load switch, a second relay operating said load switch, a second set of relay contacts, voltage supply connections normally providing a relay-energizing supply voltage, said second relay and said first and second sets of contacts being connected in series to said supply connections whereby said second relay is energized whenever normal supply voltage is provided and both of said first and second sets of contacts are closed, a third set of relay contacts closed only when said second relay is energized, said third set of contacts being connected in parallel with said second set of contacts, whereby said second relay remains energized upon an opening of said second set of contacts alone, relay means responsive to the supply voltage and closing said second set of contacts upon any interruption of the normal supply voltage and opening said second set of contacts after normal supply voltage is provided, and a normally-open reset switch connected in parallel with said second set of contacts.

3. A load-circuit protective device responsive to over-temperature conditions, comprising temperature-responsive oscillator means, a first relay normally energized by said oscillator means and deenergized upon the occurrence of over-temperature conditions, a first set of relay contacts closed only when said first relay is energized, a load switch, a second relay operating said load switch, a third relay, a second set of relay contacts open only when said third relay is energized, voltage supply connections normally providing a relay-energizing supply voltage, said second relay and said first and second sets of contacts being connected in series to said supply connections whereby said second relay is energized whenever normal supply voltage is provided and both of said first and second sets of contacts are closed, a third set of relay contacts closed only when said second relay is energized, a fourth set of relay contacts closed only when said third relay is energized, said third and fourth sets of contacts being connected in series with each other and in parallel with said second set of contacts, whereby said second relay remains energized upon operation of said third relay, a fifth set of relay contacts opened only when said third relay is energized, said third relay and said third and fifth sets of contacts being connected in series to said supply connections whereby said third relay is energized whenever normal supply voltage is provided and said third set of contacts is closed, and a sixth set of relay contacts closed only when said third relay is energized, said sixth set of contacts being connected in parallel with said third and fifth sets of contacts whereby said third relay remains energized so long as normal supply voltage is provided.

4. A load-circuit protective device responsive to over-temperature conditions, comprising temperature-responsive oscillator means, a first relay normally energized by said oscillator means and deenergized upon the occurrence of over-temperature conditions, a first set of relay contacts closed only when said first relay is energized, a load switch, a second relay operating said load switch, a second set of relay contacts, voltage supply connections normally providing a relay-energizing supply voltage, said second relay and said first and second sets of contacts being connected in series to said supply connections whereby said second relay is energized whenever normal supply voltage is provided and both of said first and second sets of contacts are closed, a third set of relay contacts closed only when said second relay is energized, said third set of contacts being connected in parallel with said second set of contacts, whereby said second relay remains energized upon an opening of said second set of contacts alone, a third relay, said second set of contacts being opened only when said third relay is energized, a fourth set of contacts, said third relay and said fourth set of contacts being connected in series to said supply connections whereby said third relay is energized whenever normal supply voltage is provided and said fourth set of contacts is closed, means closing said fourth set of contacts following a time delay after normal supply voltage is provided, and a fifth set of contacts closed only when said third relay is energized, said fifth set of contacts being connected in parallel with said fourth set of contacts, whereby said third relay remains energized so long as normal supply voltage is provided.

References Cited in the file of this patent

UNITED STATES PATENTS

| Number | Name | Date |
|---|---|---|
| 2,196,418 | Kintzig | Apr. 9, 1940 |
| 2,529,740 | Ray | Nov. 14, 1950 |